United States Patent Office 3,437,153
Patented Apr. 8, 1969

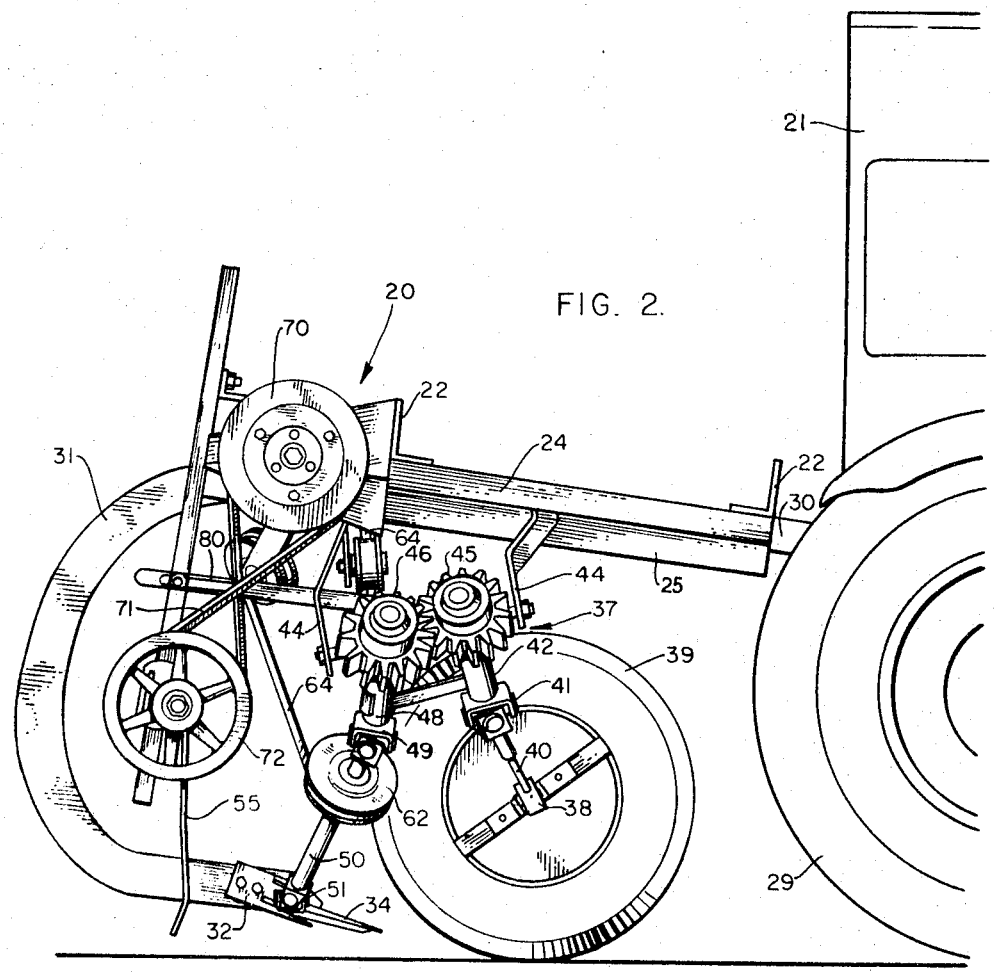
FIG. 2.
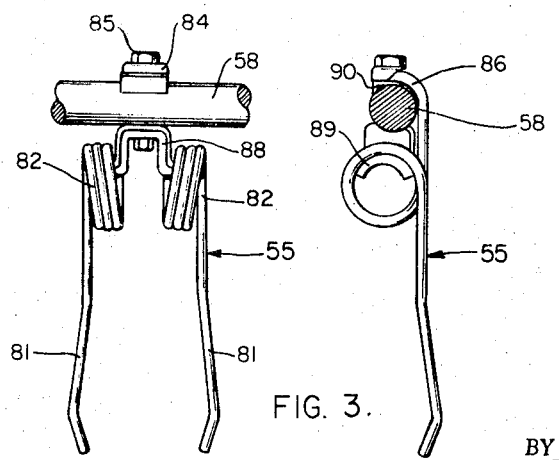
FIG. 3.
FIG. 4.
INVENTOR.
WILLARD W. SANDSTEAD
BY
Ralph F. Crandell
ATTORNEY

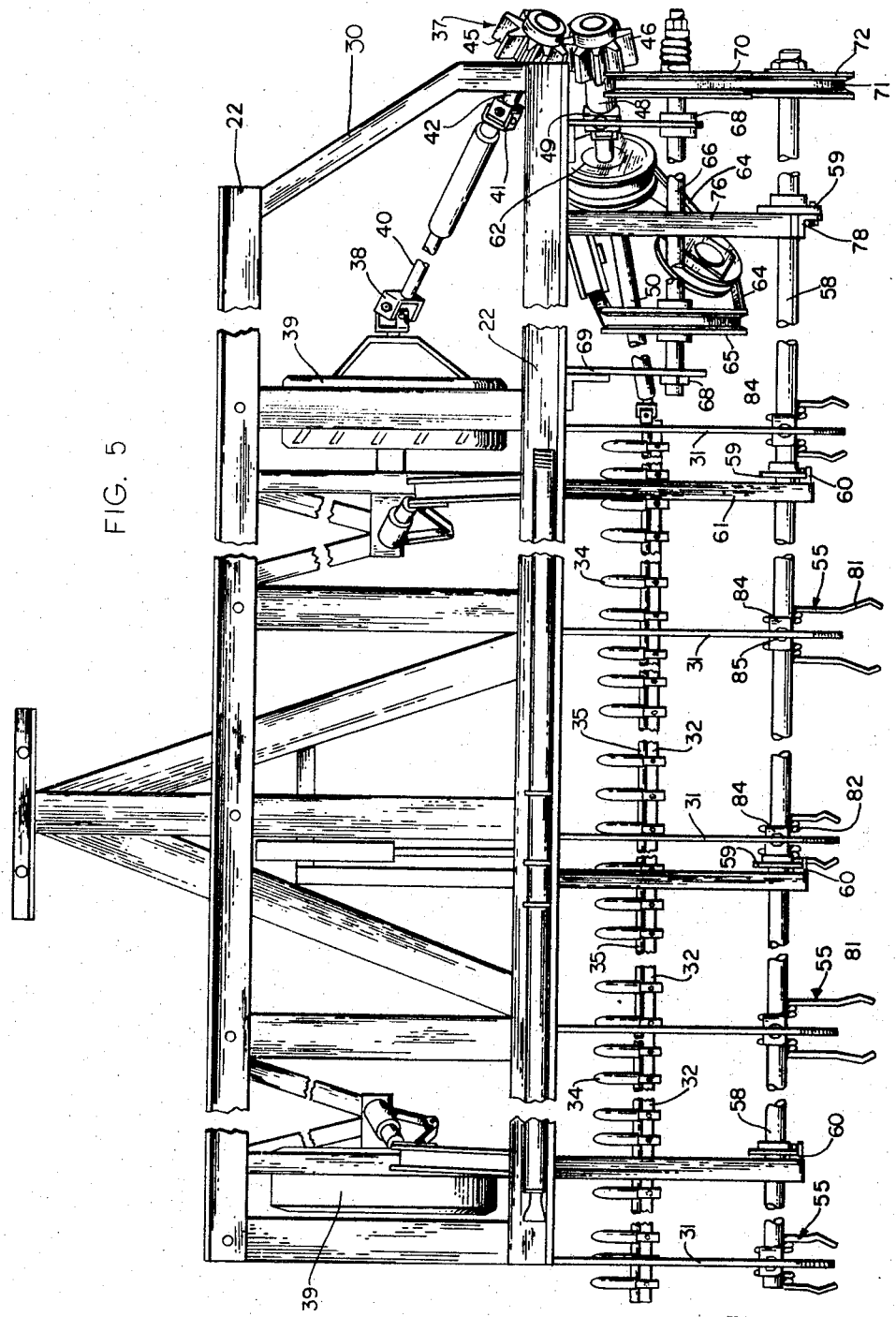

3,437,153
CLEANING MECHANISM FOR ROD WEEDER
Willard W. Sandstead, 624 Columbine St.,
Sterling, Colo. 80751
Filed Mar. 31, 1966, Ser. No. 539,195
Int. Cl. A01b 33/10
U.S. Cl. 172—39        6 Claims

ABSTRACT OF THE DISCLOSURE

A cleaning device for removing weeds and trash from the C-shaped support members of a rod weeder. The device includes a shaft journaled in supports extending from the rod weeder frame and carrying forked cleaning members. The shaft is rotated by a driving mechanism connected to the drive mechanism of the rod weeder, so that the cleaning members swing past the C-shaped members to remove accumulated trash and weeds.

---

The present invention relates to a cleaning mechanism for use with a rod weeder attachment of the type adapted to be drawn over a field by a tractor for weeding and leveling the field. More particularly, the invention relates to a cleaning mechanism or device capable of removing weeds, trash and the like from the structural members of rod weeder attachments in order to prevent the same from creating furrows in the field being weeded.

Rod weeders of the type herein contemplated generally include a wheeled frame having a plurality of C-shaped support members carrying a series of weeder teeth and a weeder rod. It is the principal object of the present invention to provide a new and improved cleaning mechanism or device for use in connection with a rod weeder attachment of the foregoing character.

More particularly, it is an object of the present invention to remove trash and weeds which hang up on the rod weeder bar supports of a weeder attachment and thereby create furrows in the field being weeded.

A more detailed object of the invention is to provide a cleaning device for rod weeders, which device is inexpensive, simple to install on existing rod weeders, light yet rugged, and which affords a positive cleaning action.

A further object of the invention is to provide a rod weeder cleaning device of the foregoing character which is adjustable to accommodate the cleaner device to the depth at which the rod weeder is operated.

Other objects and advantages will become apparent as the following description of one illustrative embodiment of the invention proceeds, taken in connection with the accompanying drawings herein:

FIG. 2 is an end-elevation view of the rod weeder attachment and cleaning mechanism shown in FIG. 1.

FIG. 3 is an enlarged, fragmentary elevation view of a portion of the rod weeder cleaner mechanism shown in FIG. 1.

FIG. 4 is a side-elevation view of the portion of the rod weeder cleaner mechanism shown in FIG. 3.

FIG. 5 is a top plan view of the rod weeder attachment and cleaning mechanism shown in FIG. 1.

Figure 1:
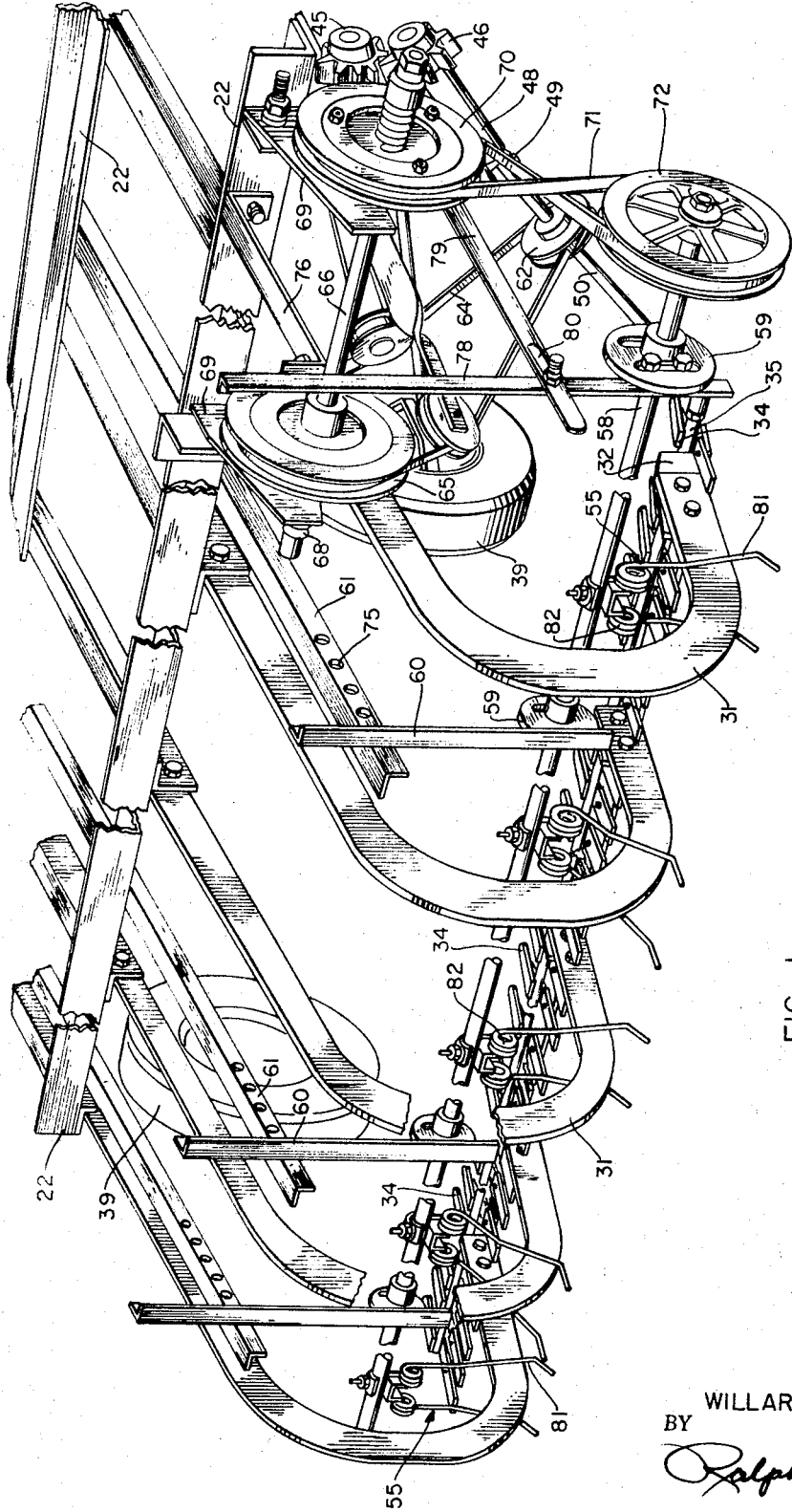
FIGURE 1 is a perspective view of a rod weeder attachment mounting a cleaning mechanism embodying the present invention.

While a certain illustrative embodiment of the present invention has been shown in the drawings and will be described below in considerable detail, it should be understood that there is no intention to limit the invention to the specific form disclosed.

There is shown in the drawings a rod weeder attachment 20 for use with a tractor or like vehicle 21. The rod weeder attachment is adapted to be pulled across a field by the vehicle 21 with the rod weeder 20 in ground engagement. The rod weeder attachment is a known and conventional mechanism and, briefly described, comprises a pair of spaced, parallel main frame members 22, constituted in the present instance of angle irons extending transversely of the vehicle, and joined by plurality of lateral support members 24 spaced apart along the main frame members and also formed of angle iron members, one leg 25 of which is directed downwardly. At each end, the frame is provided with a vertically adjustable, depending bracket 26 which supports an axle 28 on which is mounted a wheel 29. A pair of converging draw bars 30 are secured to the main frame members 22 and are provided with a suitable attachment (not shown) for engaging the tractor 21, one end of which is illustrated generally in the drawings. Extending rearwardly from the main frame members are a plurality of C-shaped members 31, formed as generally flat, wide, rigid members secured to the depending legs 25 of the lateral support members 24 and with the free end of the C-shaped member directed downwardly for ground engagement. Affixed across the lower free end of each C-shaped member is a support bar 32 carrying a plurality of spaced chisel teeth 34 and a rotatable weeder rod 35. The latter is journaled for rotation in appropriate support bearings (not shown) on the support bar and is rotated in any suitable manner, such as by a gear and shaft drive mechanism 37 coupled to one of the attachment wheels.

The illustrative weeder rod driving mechanism 37 shown in the drawings comprises a bracket 38 secured to one of the attachment wheels 39 and drivingly engaged with a shaft 40 which is coupled, through a universal joint 41, to a gear shaft 42 journaled on a bracket 44 depending from the main frame 24. The gear shaft 42 carries a pinion gear 45, which gear 45 in turn engages a driven gear 46 affixed to a driven shaft 48 journaled on the bracket 44. The shaft 48 is coupled, through a universal joint 49, to a weeder rod drive shaft 50, which in turn is drivingly connected to the weeder rod 35 through a universal coupling 51. Appropriate means (not shown) are provided for raising and lowering the attachment with respect to the wheels 39.

All of the foregoing construction is conventional and well known in the art, and for this reason a detailed description has not been provided. Suffice it to say, that when the weeder rod attachment is lowered into ground engagement, the chisel teeth 34 dig into the ground and pull the free end of the C-shaped supports 31 and the support bar 32, together with the rotating weeder rod 35, into a position beneath the surface of the ground to be leveled and weeded. The chisel teeth 34 perform a plowing action and the rotating weeder rod 35 serves to thoroughly agitate the soil and cause any weeds or other trash to be lifted to the surface. It will be appreciated that weeds and trash which accumulate on the surface of the ground will be picked up and carried by the C-shaped support members 31, and will catch and hang on those members. After a sufficient amount of trash is accumulated on the C-shaped support member 31, such trash will drag, causing furrows or ruts to be formed in the soil.

The present invention contemplates a mechanism for removing the trash and weeds which accumulate on the C-shaped members 31. To this end, the invention embodies a cleaning fork 55 provided adjacent each C-shaped member 31, each said fork 55 comprising a bifurcated member having a pair of spaced-apart tines 56 adapted, on swinging movement, to straddle each adjacent C-shaped member 31. To swing the cleaning forks, they are mounted on a shaft 58 which is rotatably positioned adjacent the C-shaped brackets 31 and extends generally parallel to the weeder rod 35. The shaft 58 is journaled in bearings 59 which are mounted on depending legs 60 of support brackets 61 secured to the main frame members 22.

Appropriate means are provided for rotating the shaft 58. One illustrative means shown in the drawings comprises a pulley and belt mechanism including a drive pulley 62 on the weeder rod drive shaft 50, which pulley is connected by means of a belt 64 to an idler pulley 65 affixed to a shaft 66 journaled in bearings 68 carried by brackets 69 extending from the frame 22. The idler shaft 66 is in turn drivingly connected through a pulley 70 and belt 71 to a driven pulley 72 fixed on the cleaner fork drive shaft 58. It will be appreciated, of course, that other drive arrangements, such as pinion gears or a chain and sprocket mechanism may be utilized to drive the cleaning mechanism, or that a separate power source may be provided for the cleaning mechanism. By locating the belt 71 with or without a twist, the direction of rotation of the cleaning forks can be determined to suit the circumstances prevailing at the time of use. For purposes of supporting the cleaning mechanism for the most efficient use, the cleaner rod supporting brackets 61 comprise rearwardly extending horizontal brackets 61 mounted on the main frame 22 of the attachment and each including a plurality of apertures 74. The depending leg 60 also includes a plurality of apertures (not shown) and is attached to the bracket 61 at one of the apertures by means of a nut and bolt. In this manner the position of the cleaner shaft 58 may be readily adjusted.

To further increase the strength and rigidity of the cleaning mechanism structure, a support bracket is provided comprising a rearwardly extending support member 76 affixed to one of the main frame members 22 and carrying, at its outer end, a depending brace 78 adjustably affixed to one of the bearing members 59. The depending brace 78 is supported intermediate its ends by an arm 79 secured at one end to the rod weeder drive supporting bracket 44 and adjustably engaged at its free end with the brace 78.

The cleaner fork 55 illustrated herein comprises a generally U-shaped member of spring steel, each tine or arm 81 of which has a spring-like coil 82 formed therein. The transverse tine joining web portion of the fork is secured to the shaft 58 by a clamp 84 engaging the shaft and tightened thereto by means of a nut and bolt arrangement 85. The coil portion 82 of each tine 81 provides sufficient resilience so that if the tine 81 hits an obstruction the fork will yield rather than break.

It is desirable that the forks be secured to the shaft 58 in such a manner that they will not rotate when engaging the ground or trash hanging on the C-shaped support members 31. To this end, at each point where a fork 55 is to be mounted, a diametral hole is provided in the shaft through which a mounting bolt extends. The central web portion 86 of each fork is provided with a bight portion bent at approximately a right angle to the tines and adapted to be positioned on top of the shaft 58 and around the clamping bolt 85 which extends therethrough. At the opposite side of the shaft there is provided a bracket 88 having a pair of opposed arms 89 extending along the shaft in spaced relation therewith and adapted to engage within the coil 82 on each tine 81 of the fork 55. The bracket is provided with a central hole through which the bolt 85 extends so that, by tightening the bolt on the shaft, the bight and coils are compressed together and the assembly tightly secured against rotation relative to the shaft. If desired, a spacer or washer 90 may be provided between the bight and the shaft to assist in further securing the assembly to the shaft.

With the foregoing invention, weeds and trash are continuously removed from the miller bar support brackets. It will be appreciated that various changes and modifications may be made without departing from the scope of the invention as hereinafter defined.

I claim as my invention:

1. A rod weeder cleaner device for use with a rod weeder attachment including a wheeled frame having a plurality of generally C-shaped support members extending rearwardly therefrom with one end of said C-shaped members disposed for ground engagement and carrying a rotatable rod weeder bar extending generally transversely to the direction of travel of said attachment, and including means operatively connected to one of the wheels of the wheeled frame for rotating said rod weeder bar, said cleaner device comprising, in combination, spaced bracket arms secured to said frame in rearwardly extending relation, each of said spaced bracket arms having an arm adjustably depending from the free end thereof to a point spaced above said rod weeder bar, bearing means carried by the free end of said depending adjustable support arms, a shaft journaled for rotation in said bearing means and spaced above and generally parallel to said rod weeder bar, means for rotating said shaft, and means on said shaft for removing weeds and trash from said C-shaped support members.

2. A rod weeder cleaner device as defined in claim 1 wherein said weed and trash removing means comprises a bifurcated member affixed to said shaft adjacent each C-shaped member and adapted to intermittently straddle said C-shaped member as said shaft rotates.

3. A rod weeder cleaner device as defined in claim 1, wherein said shaft is journaled in bearings on support members depending from the wheeled frame, and the shaft driving means comprises a pulley and belt mechanism operatively associated with the rod weeder drive.

4. A rod weeder cleaner device as defined in claim 1, wherein said means on said shaft for removing weeds and trash from said C-shaped support members comprises means adapted intermittently to straddle each said C-shaped support member, said weed and trash removing means being yieldable in response to engagement with a ground obstruction.

5. A rod weeder cleaner device as defined in claim 1, wherein said means on said shaft for removing weeds and trash from said C-shaped members comprises a bifurcated member each tine of which is provided with a yieldable coil portion.

6. A rod weeder cleaner device as defined in claim 1, wherein said shaft rotating means includes means drivingly connecting said shaft to the rod weeder bar drive means.

References Cited

UNITED STATES PATENTS

| | | | |
|---|---|---|---|
| 894,914 | 8/1908 | Stookey et al. | 172—66 |
| 1,592,545 | 7/1926 | Van Patten | 172—44 |
| 2,046,046 | 6/1936 | Washington | 172—39 |
| 2,595,537 | 5/1952 | Pitcher | 172—39 X |
| 2,719,401 | 10/1955 | Erickson et al. | 56—395 X |
| 2,886,113 | 5/1959 | Sorensen et al. | 172—39 |

FOREIGN PATENTS 867,022  2/1953  Germany.

ABRAHAM G. STONE, *Primary Examiner.*

S. C. PELLEGRINO, *Assistant Examiner.*